(12) United States Patent
Huang et al.

(10) Patent No.: US 12,455,362 B2
(45) Date of Patent: Oct. 28, 2025

(54) METHOD AND APPARATUS FOR DETERMINING ANGLE AND DISTANCE OF TARGET, RADAR AND STORAGE MEDIUM

(71) Applicant: PURPLE MOUNTAIN LABORATORIES, Jiangsu (CN)

(72) Inventors: Yongming Huang, Jiangsu (CN); Shengheng Liu, Jiangsu (CN); Zihuan Mao, Jiangsu (CN); Ruisong Cao, Jiangsu (CN); Xiaohu You, Jiangsu (CN); Wangdong Qi, Jiangsu (CN)

(73) Assignee: PURPLE MOUNTAIN LABORATORIES, Jiangsu (CN)

( * ) Notice: Subject to any disclaimer, the term of this patent is extended or adjusted under 35 U.S.C. 154(b) by 295 days.

(21) Appl. No.: 18/276,121

(22) PCT Filed: Dec. 31, 2021

(86) PCT No.: PCT/CN2021/143475
§ 371 (c)(1),
(2) Date: Aug. 7, 2023

(87) PCT Pub. No.: WO2022/166495
PCT Pub. Date: Aug. 11, 2022

(65) Prior Publication Data
US 2024/0310503 A1    Sep. 19, 2024

(30) Foreign Application Priority Data
Feb. 8, 2021    (CN) .......................... 202110170759.4

(51) Int. Cl.
*G01S 13/42* (2006.01)
*G01S 7/41* (2006.01)

(52) U.S. Cl.
CPC ............... *G01S 13/42* (2013.01); *G01S 7/411* (2013.01)

(58) Field of Classification Search
CPC ................................. G01S 13/42; G01S 7/411
(Continued)

(56) References Cited

U.S. PATENT DOCUMENTS

| | | | | |
|---|---|---|---|---|
| 8,203,485 B2* | 6/2012 | Shirakawa | ................ | G01S 3/74 |
| | | | | 342/417 |
| 10,989,808 B2* | 4/2021 | Chen | ....................... | G01S 7/282 |

(Continued)

FOREIGN PATENT DOCUMENTS

| CN | 107102291 A | 8/2017 |
|---|---|---|
| CN | 109444810 A | 3/2019 |

(Continued)

OTHER PUBLICATIONS

Shiwei Ren, et al. "Generalized Design Approach for Fourth-order Difference Co-array". School of Information and Electronics,Beijing Institute of Technology, Beijing 100081, China.

(Continued)

*Primary Examiner* — Nuzhat Pervin
(74) *Attorney, Agent, or Firm* — The Sun IP Law

(57) ABSTRACT

Provided are a method and apparatus (700) for determining an angle and a distance of a target (104, 200), a radar (102, 800), and a storage medium. The method includes: a frequency diversity signal is transmitted to a target (104, 200), and a received signal reflected by the target (104, 200) is received; an equivalent received signal vector is determined; hole filling processing is performed based on the equivalent received signal vector, so as to determine a uniform received signal vector; an equivalent received signal equation is performed based on the uniform received signal vector, and an objective function and a constraint condition is established for solving an objective optimization problem of the equivalent received signal equation (S240); and the objective optimization problem is solved to obtain an objective (Continued)

solution matrix, and the angle and the distance of the target is determined based on the objective solution matrix (S250).

20 Claims, 7 Drawing Sheets

(58) Field of Classification Search
USPC .......................................................... 342/118
See application file for complete search history.

(56) References Cited

U.S. PATENT DOCUMENTS

| | | | |
|---|---|---|---|
| 11,119,186 B2* | 9/2021 | Roh | G01S 13/42 |
| 11,448,778 B2* | 9/2022 | Wang | G01T 1/17 |
| 11,782,118 B2* | 10/2023 | Reisenfeld | G01S 3/48 |
| | | | 342/147 |
| 11,888,554 B2* | 1/2024 | Wu | H04B 7/043 |
| 11,982,732 B2* | 5/2024 | Choi | G01S 7/354 |
| 2016/0103216 A1* | 4/2016 | Whelan | G01S 13/90 |
| | | | 342/25 A |
| 2021/0239789 A1* | 8/2021 | Carswell | G06F 13/4221 |

FOREIGN PATENT DOCUMENTS

| | | | | |
|---|---|---|---|---|
| CN | 110007303 A | 7/2019 | | |
| CN | 110824444 A | 2/2020 | | |
| CN | 110850359 A | 2/2020 | | |
| CN | 111929637 A | 11/2020 | | |
| CN | 112505675 A | 3/2021 | | |
| EP | 3588128 A1 * | 1/2020 | ........... | G01S 13/931 |
| WO | 2014066360 A1 | 5/2014 | | |
| WO | WO-2021089349 A1 * | 5/2021 | ............. | G01S 7/352 |

OTHER PUBLICATIONS

"China Doctoral Dissertation Full Text Database Information Science and Technology Series". Period 1, Jan. 15, 2019. Zhou, Chengwei. Signal processing algorithm research of mutual prime array.

"China Excellent Master's Thesis Full Text Database Information Science and Technology Series". Period 1, Jan. 15, 2020. Liu, Lifeng. Research on two-dimensional target orientation estimation technology based on differential synthetic array.

* cited by examiner

METHOD AND APPARATUS FOR DETERMINING ANGLE AND DISTANCE OF TARGET, RADAR AND STORAGE MEDIUM

CROSS-REFERENCE TO RELATED APPLICATION

The present disclosure claims the priority of Chinese Patent Application 202110170759.4, filed in the China Patent Office on Feb. 8, 2021, and entitled "Method and Apparatus for Determining Angle and Distance of Target, Radar and Storage Medium", the entire contents of which are herein incorporated by reference.

TECHNICAL FIELD

The present disclosure relates to the technical field of radars, and in particular to a method and apparatus for determining the angle and distance of a target, a radar and a storage medium.

BACKGROUND

A Frequency Diverse Array (FDA for short) has been a research hotspot in the radar field since it is proposed, and it determines the angle and the distance of a target by means of a small-frequency incremental focusing beam between array elements. The degree of freedom of the frequency diversity array is severely limited by the number of sensors and the order of frequency diversity, and an available degree of freedom determines the maximum number of detectable targets, therefore how to improve the degree of freedom is a common problem in the field of array signal processing.

With regard to the existing method for determining the angle and the distance of a target, there is an improvement space for the degree of freedom.

SUMMARY

According to various embodiments of the present disclosure, provided are a method and apparatus for determining an angle and a distance of a target, a radar and a storage medium.

A method for determining an angle and a distance of a target, including: transmitting a frequency diversity signal to a target by means of a transmitter of a local radar, and receiving, by means of a receiver of the local radar, a received signal reflected by the target, wherein the receiver includes a coprime array, and a frequency offset of the frequency diversity signal has a same coprime structure as the coprime array of the receiver; determining an equivalent received signal vector of an extended virtual frequency diversity array according to the frequency diversity signal and the received signal, wherein the extended virtual frequency diversity array contains holes; performing hole filling processing based on the equivalent received signal vector, so as to determine a uniform received signal vector of a uniform virtual frequency diversity array not containing the holes; determining an equivalent received signal equation based on the uniform received signal vector, and establishing an objective function and a constraint condition for solving an objective optimization problem of the equivalent received signal equation; and solving the objective optimization problem to obtain an objective solution matrix, and determining the angle and the distance of the target based on the objective solution matrix.

An apparatus for determining an angle and a distance of a target, including: a signal transceiving module, configured to transmit a frequency diversity signal to a target by means of a transmitter of a local radar, and receive, by means of a receiver of the local radar, a received signal reflected by the target, wherein the receiver includes a coprime array, and a frequency offset of the frequency diversity signal has a same coprime structure as the coprime array of the receiver; a virtual frequency diversity extension module, configured to determine an equivalent received signal vector of an extended virtual frequency diversity array according to the frequency diversity signal and the received signal, wherein the extended virtual frequency diversity array contains holes; a hole filling module, configured to perform hole filling processing based on the equivalent received signal vector, so as to determine a uniform received signal vector of a uniform virtual frequency diversity array not containing the holes; an objective optimization problem determination module, configured to determine an equivalent received signal equation based on the uniform received signal vector, and establish an objective function and a constraint condition for solving an objective optimization problem of the equivalent received signal equation; and a target positioning module, configured to solve the objective optimization problem to obtain an objective solution matrix, and determine the angle and distance of the target based on the objective solution matrix.

A radar, including a transmitter, a receiver and a processor, wherein the transmitter and the receiver are respectively connected with the processor, the transmitter is configured to transmit a frequency diversity signal, and a frequency offset of the frequency diversity signal has a coprime structure; the receiver includes a coprime array, the coprime structure of the coprime array is the same as the coprime structure of the frequency offset of the frequency diversity signal, and each array element of the coprime array is configured to receive a received signal which is formed by reflecting the frequency diversity signal by a target; and the processor is configured to execute steps of the method for determining the angle and the distance of the target as described above.

A computer-readable storage medium, wherein a computer program is stored thereon, and when executed by a processor, the computer program implements the steps of the method for determining the angle and the distance of the target as described above.

The details of one or more embodiments of the present disclosure are set forth in the following drawings and description. Other features, objectives and advantages of the present disclosure will become apparent from the specification, drawings and claims.

BRIEF DESCRIPTION OF THE DRAWINGS

To better describe and illustrate embodiments and/or examples of those inventions disclosed herein, reference may be made to one or more drawings. Additional details or examples for describing the drawings should not be construed as limitations to the scope of any of the disclosed inventions, the currently described embodiments and/or examples, and the currently understood optimal modes of these inventions.

DETAILED DESCRIPTION OF THE EMBODIMENTS

In order to make the objectives, technical solutions and advantages of the present disclosure more clearly understood, the present disclosure is further described in detail below in combination with the drawings and embodiments. It should be understood that, the specific embodiments described herein are merely used for explaining the present disclosure, rather than limiting the present disclosure.

Figure 1:
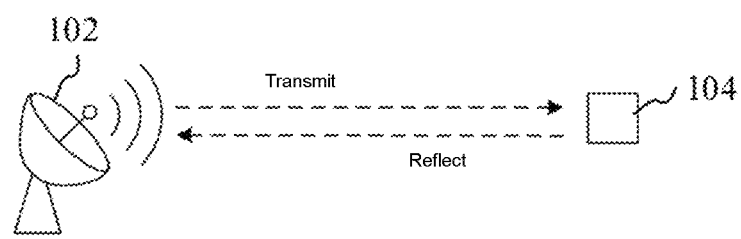
FIG. 1 is a diagram of an application environment of a method for determining the angle and a distance of a target in one embodiment.

A method for determining an angle and a distance of a target provided in the present disclosure may be applied to an application environment as shown in FIG. 1, wherein a radar 102 has a transmitter and a receiver, the radar 102 may transmit a frequency diversity signal to a target 104 around the radar 102 by means of the local transmitter, and may receive, by means of the local receiver, a received signal reflected by the target 104. The radar 102 executes, on the target 104, the method for determining the angle and the distance of the target provided in various embodiments of the present disclosure, so as to determine the angle and the distance of the target 104 relative to the radar 102.

Figure 2:
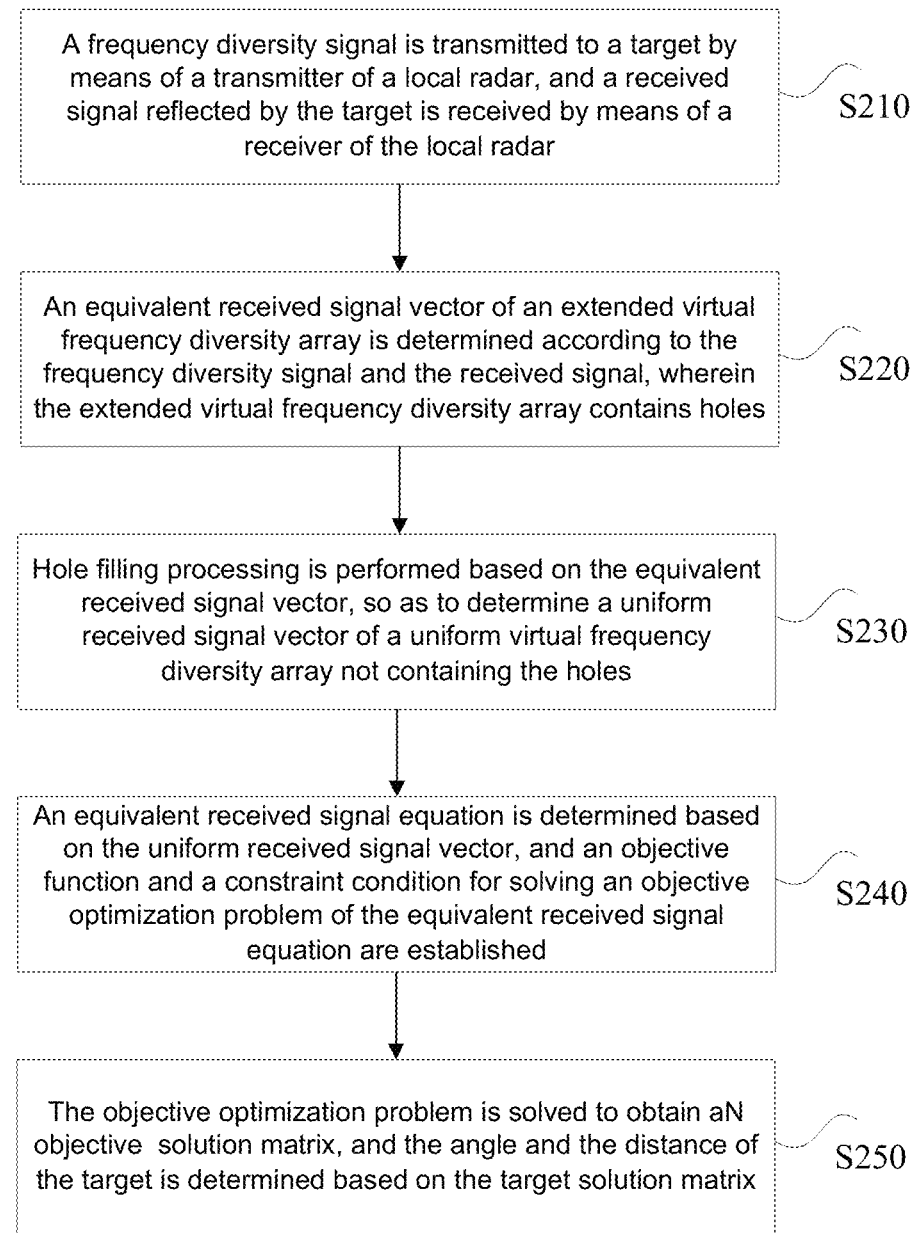
FIG. 2 is a schematic flowchart of a method for determining the angle and the distance of the target in one embodiment.

In one embodiment, as shown in FIG. 2, provided is a method for determining an angle and a distance of a target. It is taken as an example for illustration that the method is applied to the radar 102 in FIG. 1, and the method includes the following steps S210 to S250.

Step S210, a frequency diversity signal is transmitted to a target by means of a transmitter of a local radar, and a received signal reflected by the target is received by means of a receiver of the local radar.

The receiver includes a coprime array, and the frequency offset of the frequency diversity signal has the same coprime structure as the coprime array of the receiver. As at least one alternative embodiment, an offset array composed of a plurality of frequency offsets between transmission frequencies in the frequency diversity signal is the same as an offset array composed of a plurality of location offsets between array elements in the coprime array.

Step S220, an equivalent received signal vector of an extended virtual frequency diversity array is determined according to the frequency diversity signal and the received signal, wherein the extended virtual frequency diversity array contains holes.

In one embodiment, the step S220 includes the following steps S221 to S225.

Step S221, a coprime array model is established according to coprime structure information of the coprime array of the receiver, wherein the coprime array model is formed by two uniform sparse sub-arrays.

Exemplarily, in the present step, the corresponding coprime array model may be established according to the coprime structure information of the coprime array of the receiver, and the coprime array model is formed by two uniform sparse sub-arrays. The total number of array elements of one sub-array (which is referred to as a first sub-array) is M, and the spacing between the array elements is Nd. The total number of array elements of the other sub-array (which is referred to as a second sub-array) is N, and the spacing between the array elements is Md. The first array element of the first sub-array and the first array element of the second sub-array may be the same array element, so that the total number of physical array elements in the coprime array is M+N−1, the locations of the first sub-array and the second sub-array may be respectively expressed as $\mathbb{S}_1=\{nMd|n=0, 1, \ldots, N-1\}$ and $\mathbb{S}_2=\{mNd|m=0, 1, \ldots, M-1\}$, wherein m represents the mth array element, and n represents the nth array element. Thus, the coprime array composed of the first sub-array and the second sub-array is expressed as a coprime array $\mathbb{S} = \mathbb{S}_1 \cup \mathbb{S}_2 = \{u_q d | q=1, 2, \ldots, M+N-1\}$, wherein q represents the qth array element, $u_q d$ represents the location of the qth array element in the coprime array, $u_q$ represents the number of distance offsets of the qth array element, and d represents a unit distance.

Step S222, a frequency diversity model is established according to the frequency diversity information of the transmitter for transmitting the frequency diversity signal.

Exemplarily, in the present step, similarly, a corresponding frequency diversity model $\mathbb{F} = \{f_0 + u_p \Delta f, p=1, \ldots, M+N-1\}$ is established according to the frequency diversity information of the transmitter for transmitting the frequency diversity signal, wherein $f_0$ represents the original center frequency, p represents the pth transmission frequency, $u_p$ represents the number of frequency offsets of the pth transmission frequency, and $\Delta f$ represents a unit frequency offset. It can be seen that, the frequency offset of the established frequency diversity model has the same coprime structure features as the coprime array model. As at least one alternative embodiment, an offset number array corresponding to the frequency offset of the frequency diversity model is the same as an offset number array of the coprime array model.

Figure 3:
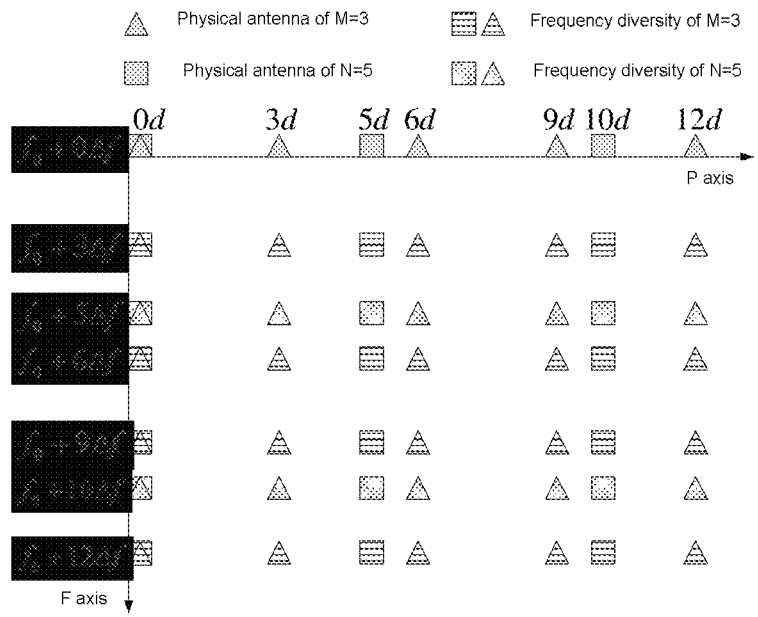
FIG. 3 is a schematic diagram of a coprime frequency diversity array model in one embodiment.

Taking M=3 and N=5 as an example, the coprime frequency diversity array model determined by the step S221 and the step S222 is shown in FIG. 3, and the coprime frequency diversity array model contains information of the coprime array model and the frequency diversity model.

Step S223, a received signal vector of the coprime array is determined according to the received signal, the frequency diversity model and the coprime array model.

Exemplarily, in the present step, the ith frequency diversity vector may be determined according to the received signal, the frequency diversity model and the coprime array model, and a received signal which is received by the Ith array element after being reflected by the kth target is:

$$x_{i,l}(t) = \sum_{k=1}^{K} \varphi_k e^{-j2\pi f_0 t} e^{j\frac{4\pi}{\lambda_i} R_k} e^{-j\frac{2\pi}{\lambda_i} u_l \sin\theta_k} + n_{i,l}(t) \quad (1)$$

wherein $u_l$ represents the number of offsets of the Ith array element, K represents the total number of targets, $\varphi_k$, $R_k$ and $\theta_k$ respectively represent amplitude attenuation of the signal, the distance of the target and the angle of the target. $\lambda_i=c/(f_0+u_i\Delta f)$ corresponds to a half-wavelength of the ith carrier frequency, c represents the light speed, t represents the moment, $n_{i,l}(t)$ represents Gaussian white noise at the moment t. Matched filtering is performed on the received signal to obtain a received signal subjected to matched filtering:

$$x_{i,l}(t) \approx \sum_{k=1}^{K} \varphi_k e^{j\frac{4\pi}{c}f_0 R_k} e^{j\frac{4\pi}{c}u_i \Delta f R_k} e^{-j\frac{2\pi}{c}f_0 u_l d \sin\theta_k} + n_{i,l}(t) \quad (2)$$

wherein $u_i$ represents the number of offsets of the ith frequency diversity vector, for the values of i is from 1 to M+N−1, and the values of I is from 1 to M+N−1, stacking processing is performed on all $x_{i,l}(t)$ which is obtained by taking all values of i and l, so as to obtain the received signal vector of the entire coprime array: $x(t) \in \mathbb{C}^{(M+N-1)^2 \times 1}$, $x(t) \in \mathbb{C}^{(M+N-1)^2 \times 1}$ represents a complex vector in the dimension of $(M+N-1)^2 \times 1$, and the received signal vector x(t) may be expressed as:

$$X(t) = \sum_{k=1}^{K} \varphi_k(t) a_{p,f}(\theta_k, R_k) + n(t) = A_{p,f}\Phi(t) + n(t) \quad (3)$$

in the above formula, $\varphi_k(t)$ represents the amplitude attenuation of the signal at the moment t, and n(t) represents a received noise vector formed by stacking all values of i and l by $n_{i,l}(t)$.

wherein:

$$\Phi(t) = [\varphi_1(t), \varphi_2(t), \ldots, \varphi_k(t), \ldots, \varphi_K(t)]^T \quad (4.1)$$

$$A_{p,f} = [a_{p,f}(\theta_1, R_1), a_{p,f}(\theta_2, R_2), \ldots, a_{p,f}(\theta_k, R_k), \ldots, \quad (4.2)$$

$$a_{p,f}(\theta_K, R_K)]$$

$$a_{p,f}(\theta_k, R_k) = a_p(\theta_k) \otimes a_f(R_k) \quad (4.3)$$

$$a_p(\theta_k) = \left[1, e^{-j\pi u_2 \sin\theta_k}, \ldots, e^{-j\pi u_q \sin\theta_k}, \ldots, e^{-j\pi u_{M+N-1} \sin\theta_k}\right]^T \quad (4.4)$$

$$a_f(R_k) = \quad (4.5)$$

$$e^{-j\frac{4\pi}{c}f_0 R_k}\left[1, e^{j\frac{4\pi}{c}u_2 R_k \Delta f}, \ldots, e^{j\frac{4\pi}{c}u_q R_k \Delta f}, \ldots, e^{j\frac{4\pi}{c}u_{M+N-1} R_k \Delta f}\right]^T$$

Step S224, a covariance matrix of the coprime array is determined according to the received signal vector.

Exemplarily, in the present step, according to the received signal vector determined in the foregoing step, the covariance matrix of the coprime frequency diversity array may be written as:

$$R_x = E[x(t)x^H(t)] = \sum_{k=1}^{K} p_k a_{p,f}(\theta_k, R_k) a_{p,f}^H(\theta_k, R_k) + \sigma_n^2 I \quad (5)$$

wherein $\sigma_n$ represents noise power, I represents a unit matrix, and $p_k$ represents the power reflected by the kth target (i.e., the kth signal source). In practice, $R_x$ is estimated by Q snapshots on average.

Step S225, the covariance matrix is vectorized to obtain the equivalent received signal vector of the extended virtual frequency diversity array, wherein the equivalent received signal vector contains a steering vector of the extended virtual frequency diversity array; and the extended virtual frequency diversity array (i.e, a non-uniform virtual frequency diversity array) contains holes.

Exemplarily, in the present step, by means of vectorizing the covariance matrix $R_x$, the equivalent received signal vector of the extended virtual frequency diversity array may be obtained:

$$y_v = vec(R_x) = A_v p + \sigma_n^2 i \quad (6)$$

wherein $A_v=[a^*_{p,f}(\theta_1, R_1)\text{\ss}a_{p,f}(\theta_1, R_1), \ldots, a^*_{p,f}(\theta_K, R_K)\text{\ss}a_{p,f}(\theta_K, R_K)] \in \mathbb{C}^{(M+M-1)^2 \times K}$ and $p=[p_1, \ldots, p_K]^T$ represents the power of the Kth source signal, and i represents the vector obtained after the unit array is vectorized. The steering array $A_v$ forms the extended virtual frequency diversity array which contains a virtual array element and a virtual frequency offset. In a spatial domain (which is denoted as a P axis), the location of the formed virtual array element is $\mathbb{V}_1^d$, wherein $\mathbb{V}_1=\{\pm(u_m-u_n)|m,n=0, 1, \ldots, M+N-1\}$, $u_m$ represents the number of offsets of the mth array element in the first sub-array, and $u_n$ represents the number of offsets of the nth array element in the second sub-array. In a frequency domain, that is, on an F axis, the virtual frequency diversity of each array element is captured by $\mathbb{V}_2\Delta f$, wherein $\mathbb{V}_2=\mathbb{V}_1$. Repetitive elements in $\mathbb{V}_1$ and $\mathbb{V}_2$ are discarded to obtain $\tilde{\mathbb{V}}_1=\tilde{\mathbb{V}}_2=\mathbb{V}_v$, wherein $\mathbb{V}_v=\{\pm(Mn-Nm)|n=0, 1, \ldots, N-1, m=0, 1, \ldots, M-1\}$ The array element located at $\mathbb{V}_v d$ has the frequency diversity of $\mathbb{V}_v \Delta f$, which constitutes the extended virtual frequency diversity array. $\mathbb{C}_V$ represents the extended virtual frequency diversity array containing holes, and $\mathbb{C}_I$ represents the corresponding uniform virtual frequency diversity array. Then:

$$[\mathbb{C}_V]_{i,j} = \begin{cases} [\mathbb{C}_I]_{i,j}, & i, j \in \mathbb{V}_v \\ 0, & i/j \in [-\mu_{max}, -\mu_{max}] - \mathbb{V}_v \end{cases} \quad (7)$$

wherein $[\bullet]_{i,j}$ represents a virtual element in (id, j$\Delta$f), i represents any number i of distance offsets, j represents any number j of frequency offsets, and the maximum number of offsets is $\mu_{max}=\max\{M(N-1), N(M-1)\}$.

Figure 4:
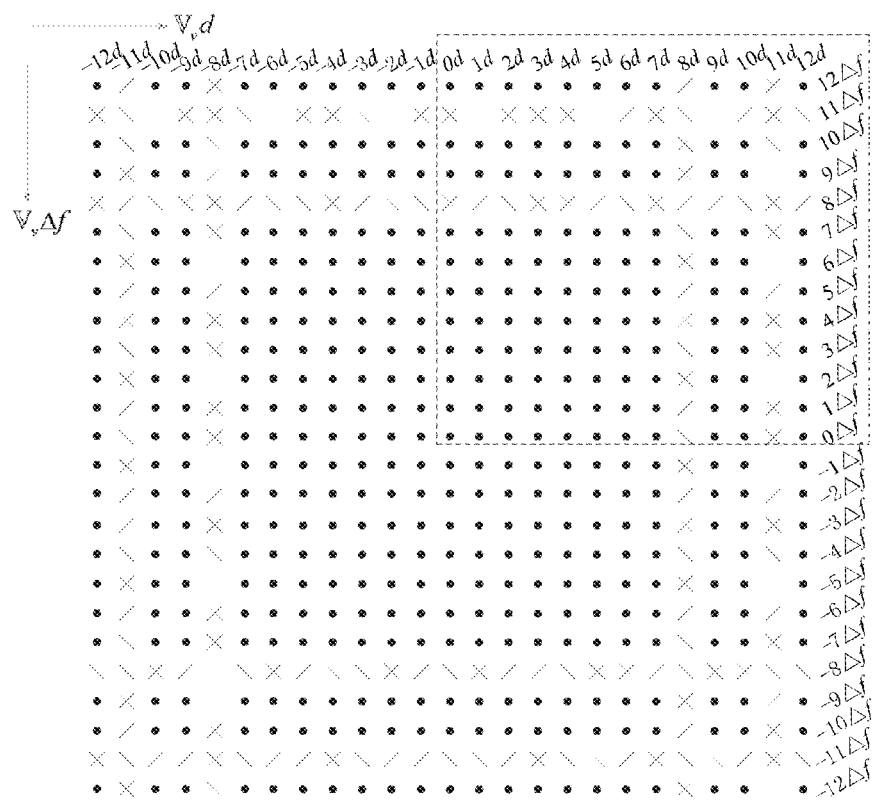
FIG. 4 is a schematic diagram of an extended virtual frequency diversity array in one embodiment.

If the coprime frequency diversity array configured in FIG. 1 is considered, the corresponding extended virtual frequency diversity array $C_V$ is expressed as shown in FIG. 4.

Step S230, hole filling processing is performed based on the equivalent received signal vector, so as to determine a uniform received signal vector of a uniform virtual frequency diversity array not containing the holes.

In one embodiment, the step S230 includes the following steps S231 to S234.

Step S231, a non-negative received signal vector of a non-negative area in the extended virtual frequency diversity array is determined according to the equivalent received signal vector, wherein a non-negative equivalent virtual array received signal vector contains a steering vector of the coprime array and a steering vector of the frequency offset, which are decoupled from each other.

Exemplarily, in the present step, in order to establish a mathematical representation of the coprime frequency diversity array, non-negative half-axis portions (e.g., dashed line block diagram portions in FIG. 4) of an array element axis and a frequency axis are considered. The steering vector in an array dimension may be expressed as: $\bar{a}_p(\theta_k)=[1, \exp\{-j\pi \sin \theta_k\}, \ldots, \exp\{-j\pi\mu_{max} \sin \theta_k\}]^T$, $j$ represents an imaginary unit $\sqrt{-1}$, and the steering vector in a frequency dimension may be expressed as $\bar{a}_f(R_k)=[1, \exp\{j4\pi\Delta fR_k/c\}, \ldots, \exp\{j4\pi\mu_{max}\Delta fR_k/c\}]^T$. Therefore, steering matrices corresponding to K signal sources are $\bar{A}_p=[\bar{a}_p(\theta_1) \ldots, \bar{a}_p(\theta_K)]$ and $\bar{A}_f=[\bar{a}_f(R_1) \ldots, \bar{a}_f(R_K)]$. The non-negative received signal matrix of the non-negative area in $C_V$ may be written as:

$$\tilde{X}(t) = \tilde{X}_{UV} \circ G \quad (8)$$

Wherein $G=g_p g_f^T$, and $g_p=g_f$ is a binary matrix for distinguishing virtual elements from the holes in a non-negative axis. $\tilde{X}_{UV}$ represents a two-dimensional numerical matrix received from the non-negative area of the uniform virtual frequency diversity array, then:

$$\tilde{X}_{UV} = \bar{A}_p S(t) \bar{A}_f + N(t) \quad (9)$$

wherein $S(t)=\mathrm{diag}\{s(t)\}$, $s(t)=[s_1(t), \ldots s_k(t), \ldots, s_K(t)]^T$ represents a signal beam vector, and $s_k(t)$ represents a complex waveform of the kth target signal. $N(t)$ represents a noise matrix, which is subject to $\mathcal{N}(0, \sigma^2)$ $\mathcal{N}(0, \sigma^2)$ represents a Gaussian distribution, and o represents the variance of the Gaussian distribution.

A non-negative received signal matrix $\tilde{X}$ in the dimension of is $(\mu_{max}+1)\times(\mu_{max}+1)$ vectorized into a non-negative received signal vector $\tilde{x}(t)$:

$$\tilde{x}(t) = vec(\tilde{X}(t)) = ((\bar{A}_p \odot \bar{A}_f)s(t) + n(t)) \circ (g_p \otimes g_f) \quad (10)$$

wherein $n(t)=vec(N(1))$

Step S232, a non-negative covariance matrix of the coprime array is determined according to the non-negative received signal vector.

Exemplarily, in the present step, according to the non-negative received signal vector $\tilde{x}(t)$ determined in the above step, a corresponding covariance matrix $\tilde{R}$ in the dimension of $(\mu_{max}+1)^2 \times (\mu_{max}+1)^2$ may be determined, and the covariance matrix $\tilde{R}$ may be expressed as:

$$\tilde{R} = E[\tilde{x}(t)\tilde{x}^H(t)] \quad (11)$$
$$= ((\bar{A}_x \odot \bar{A}_y)R_s(\bar{A}_x \odot \bar{A}_y)^H + \sigma^2 I) \circ G$$
$$= \tilde{R}_{UV} \circ G$$

wherein $R_s=E[s(t)s^H(t)]=\mathrm{diag}\{p\}$, $p=[p_1, \ldots, p_K]^T$ represents the power of the K signal sources. $\tilde{R}_{UV}=(\bar{A}_p \odot \bar{A}_f)R_s(\bar{A}_p \odot \bar{A}_f)^H+\sigma^2 I$ represents the covariance matrix of the uniform virtual frequency diversity array.

In order to understand the coupling angle and distance, a double-Toeplitz matrix $\tilde{R}_{UV}$ may be rewritten as:

$$\tilde{R}_{UV} = \sum_{k=1}^{K} p_k(\bar{a}_p(\theta_k) \otimes \bar{a}_f(R_k))(\bar{a}_p(\theta_k) \otimes \bar{a}_f(R_k))^H + \sigma^2 I \quad (12)$$
$$= \sum_{k=1}^{K} p_k(\bar{a}_p(\theta_k)\bar{a}_p^H(R_k)) \otimes (\bar{a}_f(\theta_k) \otimes \bar{a}_f^H(R_k)) + \sigma^2 I$$

For ease of representation, it is set that $\bar{C}_p(\theta_k) = \bar{a}_p(\theta_k)a_p^{-H}(\theta_k)$ and $\bar{D}_f(R_k)=\bar{a}_f(R_k)a_f^{-H}(R_k)$. In this way, the above formula $\tilde{R}_{UV}$ may be simplified as:

$$\tilde{R}_{UV} = \sum_{k=1}^{K} p_k \bar{C}_p(\theta_k) \otimes \bar{D}_f(R_k) + \sigma^2 I. \quad (13)$$

Step S233, the non-negative covariance matrix is vectorized, so as to obtain a non-negative equivalent virtual array received signal vector; and similarly, $\tilde{R}=\tilde{R}_{UV} \circ G$ is vectorized, so as to obtain a non-negative equivalent virtual array received signal vector $\tilde{r}$:

$$\tilde{r} = \left(\sum_{k=1}^{K} p_k \tilde{a}_k + \sigma^2 \tilde{i}\right) \circ \tilde{g} \quad (14)$$

in the above formula, $\tilde{g}$ represents the vector obtained by vectorizing G.
Wherein:

$$\tilde{a}_k = \tilde{a}_p(\theta_k) \otimes \tilde{a}_f(R_k) = vec(\bar{C}_p(\theta_k)) \otimes vec(\bar{D}_f(R_k)) \quad (15)$$
$$= (a_p^*(\theta_k) \otimes a_p(\theta_k)) \otimes (a_f^*(R_k) \otimes a_f(R_k))$$

The vector $\tilde{a}_k$ decouples the steering vector of the coprime array from the steering vector of the frequency offset.

Step S234, repetitive elements in the non-negative equivalent virtual array received signal vectors are removed, and the remaining elements are rearranged, so as to determine the uniform received signal vector of the uniform virtual frequency diversity array.

In one embodiment, the step S234 includes the following steps S2341 to S2344.

Step S2341, repetitive elements in the steering vector of the coprime array are removed, and the remaining elements are rearranged, so as to obtain the steering vector of the coprime array not containing the holes.

Exemplarily, in the present step, the repetitive elements in $\tilde{a}_p(\theta_k)$ are removed, and the remaining elements are rearranged, so as to obtain the steering vector $\tilde{a}_{v_p}(\theta_K)$ of the coprime array not containing the holes:

$$\tilde{a}_{v_p}(\theta_k) = \left[e^{-j\pi\mu_{max}sin\theta_k}, \ldots, e^{j\pi\mu_{max}sin\theta_k}\right]^T \quad (16)$$

Step S2342, repetitive elements in the steering vector of frequency offset are removed, and the remaining elements are rearranged, so as to obtain the steering vector of the frequency offset not containing the holes.

Similarly, with regard to the frequency offset, in the present step, the repetitive elements in $\tilde{a}_f(R_k)$ are removed, and the remaining elements are rearranged, so as to obtain the steering vector $\tilde{a}_{V_f}(R_k)$ of all frequency offsets not containing the holes:

$$\tilde{a}_{V_f}(R_k) = \left[e^{-j4\pi\mu_{max}\Delta fR_k/c}, \ldots, e^{j4\pi\mu_{max}\Delta fR_k/c}\right]^T \quad (17)$$

Step S2343, based on the steering vector of the coprime array not containing the holes and the steering vector of the frequency offset not containing the holes, the steering vector of the uniform virtual frequency diversity array not containing the holes is determined.

In the present step, based on $\tilde{a}_{V_p}(\theta_k)$ and $\tilde{a}_{V_f}(R_k)$ obtained in the foregoing steps, the steering vector of the entire two-dimensional uniform virtual frequency diversity array may be expressed as:

$$\tilde{a}_{V_k} = \left(\tilde{a}_{V_p}(\theta_k) \otimes \tilde{a}_{V_f}(R_k)\right) \quad (18)$$

Step S2344, based on the steering vector of the uniform virtual frequency diversity array, the uniform received signal vector of the uniform virtual frequency diversity array is determined.

Based on the above process from $\tilde{a}_k$ to $\tilde{a}_{V_k}$, since $\tilde{A}_V = [\tilde{a}_{V_1}, \ldots, \tilde{a}_{V_K}]$ in $\tilde{y}_V$ mainly includes $\tilde{a}_{V_k}$, similarly, repetitive (with the same physical meaning) elements in $\tilde{r}$ are removed, and the remaining elements are rearranged to obtain the uniform received signal vector $\tilde{y}_V$ of the entire uniform virtual frequency diversity array, that is:

$$\tilde{y}_v = \left(\tilde{A}_v p + \sigma^2 \tilde{i}_v\right) \cdot \tilde{g}_v \quad (19)$$

wherein $\tilde{A}_V = [\tilde{a}_{V_1}, \ldots, \tilde{a}_{V_K}]$. $\tilde{i}_V$ and $\tilde{g}_V$ are respectively corresponding sub-vectors of $\tilde{i}$ and $\tilde{g}$.

Step S240, an equivalent received signal equation is determined based on the uniform received signal vector, and an objective function and a constraint condition is established for solving an objective optimization problem of the equivalent received signal equation.

In one embodiment, the step S240 includes the following steps S241 to S245.

Step S241, the equivalent received signal equation is determined based on the uniform received signal vector.

Figure 5:
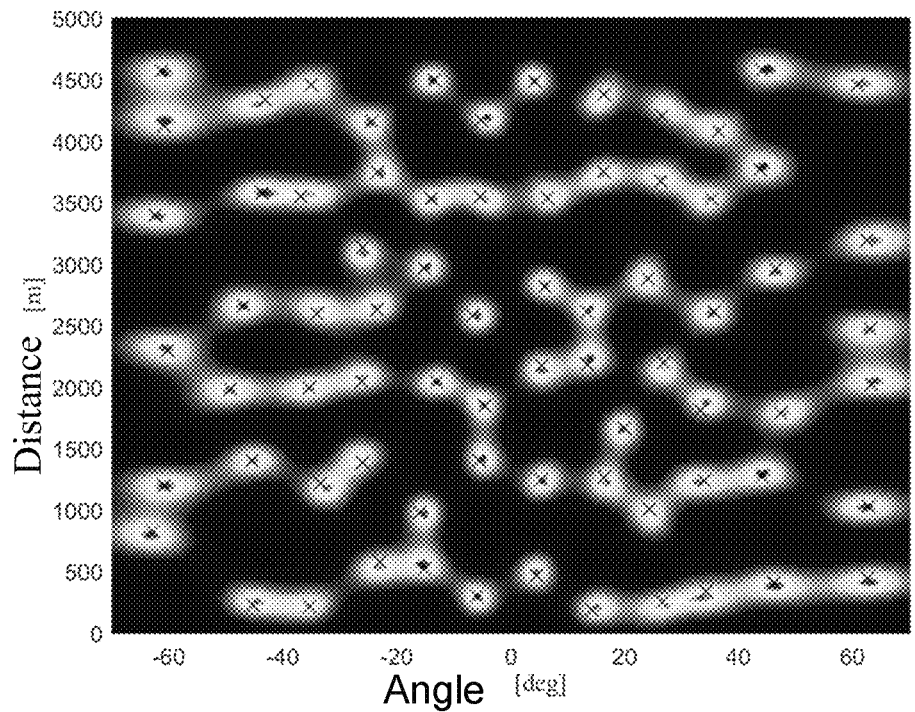
FIG. 5 is a schematic diagram of an angle-distance spectrum in one embodiment.

In the present step, based on the uniform received signal vector $\tilde{y}_V$, the equivalent received signal $\tilde{Y}_V \in \mathbb{C}^{(2\mu_{max}+1)\times(2\mu_{max}+1)}$ may be expressed as:

$$\tilde{Y}_v = \left(\sum_{k=1}^{K} p_k \left(\tilde{a}_{V_f}(R_k)\tilde{a}_{V_p}^T(\theta_k)\right) + \sigma^2 \tilde{I}_v\right) \cdot \tilde{G}_v \quad (20)$$

wherein $\mathbb{C}^{(2\mu_{max}+1)\times(2\mu_{max}+1)}$ represents a complex matrix in the dimension of $(2\mu_{max}+1)\times(2\mu_{max}+1)$, and $\tilde{I}_V$ and $\tilde{G}_V$ are respectively sub-matrices of $\tilde{i}_V$ and $\tilde{g}_V$. The equivalent two-dimensional coprime frequency diversity array signal contains holes, as shown in FIG. 5.

The above formula (20) is the equivalent received signal equation, and the hole portions may be recovered by using the above equation (20) as a reference signal constraint equation in the step S243, so as to obtain a received signal with recovered holes.

Step S242, based on the equivalent received signal equation, a noise-free received signal model of the extended virtual frequency diversity array is established.

Exemplarily, in the present step, the noise-free received signal model of the virtual frequency diversity array may be expressed as:

$$Y = \sum_{k=1}^{K} B(\theta_k, R_k) p_k \quad (21)$$

wherein an atom $B(\theta, R)$ is established based on information in the equivalent received signal equation:

$$B(\theta, R) = \tilde{a}_{V_f}(R)\tilde{a}_{V_p}^T(\theta) \in \mathbb{C}^{(2\mu_{max}+1)\times(2\mu_{max}+1)} \quad (22)$$

in the above formula, $\theta$ represents angle, R represents distance, $\tilde{a}_{V_f}(R)$ represents a distance dimension steering vector, and $\tilde{a}_{V_p}(\theta)$ represents an angle dimension steering vector.

An atom set is then defined:

$$\mathbb{A} = \left\{B(\theta, R), \theta \in [0, 2\pi], R \in \left[0, \frac{c}{2\Delta f}\right]\right\} \quad (23)$$

$$= \left\{\tilde{a}_{V_f}(R)\tilde{a}_{V_p}^T(\theta), \theta \in [0, 2\tau], R \in \left[0, \frac{c}{2\Delta f}\right]\right\}$$

Step S243, an atomic norm of the noise-free received signal model is determined, a minimum convex relaxation atomic number is introduced, the atomic norm is converted into a convex relaxation atomic norm, and an objective function and a constraint condition of an optimization problem for minimizing the convex relaxation atomic norm is determined.

Exemplarily, in the present step, the atomic norm of the noise-free received signal model Y is expressed as:

$$\|Y\|_{A0} = \inf_{K}\left\{Y = \sum_{k=1}^{K} B(\theta_k, R_k) p_k, B(\theta, R) \in \mathbb{A}, R_k \in \mathbb{R}\right\} \quad (24)$$

in the above formula, $$\inf_{K}\{\cdot\}$$

represents a lower boundary of K.

The minimization of the above formula is an NP (Non-determinable Polynomenal) difficult problem. The atomic norm represents a minimum atomic number, but this problem is difficult to be solved. In order to solve the NP difficult problem, atomic norm convex relaxation may be introduced, and the atomic norm convex relaxation is to convert solving the minimum atomic number into solving a minimum sum of atomic weighted values, such that the atomic norm may be converted into the convex relaxation atomic norm:

$$\|Y\|_A = \inf\left\{\sum_{k=1}^{K}|p_k| \middle| Y = \sum_{k=1}^{K} B(\theta_k, R_k) p_k, B(\theta, R) \in \mathbb{A}\right\} \quad (25)$$

In order to recover the holes, the objective function and the constraint condition of this optimization problem are described by minimizing the convex relaxation atomic norm:

$$\hat{Y} = \underset{Y}{\operatorname{argmin}} \|Y\|_\mathbb{A} \qquad (26)$$

$$\text{s.t. } \|Y_{\mathbb{C}_V} - \tilde{Y}_v\| \leq \epsilon$$

wherein $\epsilon$ represents an upper boundary of a noise effect, and $Y_{\mathbb{C}_V}$ represents an element of Y on $\mathbb{C}_V$.

Step S244, the optimization problem is converted into a positive semi-definite problem, so as to determine an objective function and a constraint condition of the positive semi-definite problem.

Exemplarily, in the present step, the convex relaxation atomic norm may be calculated by means of the positive semi-definite problem, and the objective function and the constraint condition of the positive semi-definite problem are as follows:

$$\min_{u_x,u_y,Y} \frac{1}{2\sqrt{NM}}(tr(T(u_x)) + tr(T(u_y))) \qquad (27)$$

$$\text{s.t. } \begin{bmatrix} T(u_x) & Y \\ Y^H & T(u_y) \end{bmatrix} \succeq 0$$

$$\|Y \cdot G_v - \tilde{Y}_v\|_F^2 - \leq \epsilon$$

wherein $T(u_x)$, $T(u_y) \in \mathbb{C}^{(2\mu_{max}+1)\times(2\mu_{max}+1)}$ represents a first-order Hermitian-Toeplitz matrix, the first-order Hermitian-Toeplitz matrix is respectively defined by a first column of elements $u_x$ and $u_y$. If the first column of one Hermitian-Toeplitz matrix is known, it is equivalent to knowing all of this matrix. $G_V = g_{V_p} g_{V_f}^T \in \mathbb{C}^{(2\mu_{max}+1)\times(2\mu_{max}+1)}$, and $g_{V_p} = g_{V_f} \in \mathbb{C}^{(2\mu_{max}+1)\times 1}$ represents a binary matrix to distinguish virtual elements from holes on the P axis and the F axis.

Step S245, the positive semi-definite problem is converted into an objective optimization problem for accommodating the number of elements in the extended virtual frequency diversity array to control a noise threshold value, so as to determine the objective function and the constraint condition of the objective optimization problem.

Exemplarily, in the present step, in order to enable the objective optimization problem to accommodate the number of elements in $\mathbb{C}_V$ to control the noise threshold value, the foregoing optimization problem may be converted into an objective optimization problem with the following objective function and constraint condition:

$$\min_{u_x,u_y,Y} \frac{1}{2\sqrt{NM}}(tr(T(u_x)) + tr(T(u_y))) \qquad (28)$$

$$\text{s.t. } \begin{bmatrix} T(u_x) & Y \\ Y^H & T(u_y) \end{bmatrix} \succeq 0$$

$$\|Y \cdot G_v - \tilde{Y}_v\|_F^2 \leq |G_v|\eta$$

wherein $\eta$ represents a decimal for controlling the noise threshold value.

Step S250, the objective optimization problem is solved to obtain an objective solution matrix, and the angle and distance of the target is determined based on the objective solution matrix.

In one embodiment, the step S250 includes the following steps S251 to S253.

Step S251, the objective optimization problem is solved, so as to determine the objective solution matrix.

The objective optimization problem determined in the above step is convex, and may be solved by using, for example, a CVX toolbox, so as to obtain the objective solution matrix $\hat{Y} \in \mathbb{C}^{(2\mu_{max}+1)\times(2\mu_{max}+1)}$.

Step S252, corresponding elements is selected from the objective solution matrix, so as to construct a covariance matrix of the uniform virtual frequency diversity array, wherein after the objective solution matrix $\hat{Y} \in \mathbb{C}^{(2\mu_{max}+1)\times(2\mu_{max}+1)}$ is obtained, the covariance matrix $\tilde{R}_{UV}$ may be constructed by selecting elements corresponding to $\tilde{R}_{UV}$ in the objective solution matrix $\hat{Y}$.

Step S253, estimation processing is performed on the covariance matrix, so as to determine the angle and the distance of the target.

In the present step, the covariance matrix $\tilde{R}_{UV}$ may be estimated by means of a given algorithm, so as to determine the angle and the distance of the target. Exemplarily, the covariance matrix $\tilde{R}_{UV}$ may be estimated by using the following MUSIC algorithm, so as to determine the angle and the distance of the target.

Algorithm 1: two-dimensional MUSIC algorithm for jointly estimating the distance and the angle Input: the covariance matrix $\tilde{R}_{UV}$.

(1) feature value decomposition is performed on $\tilde{R}_{UV}$, and feature vectors corresponding to small feature values other than K large feature values are extracted, so as to construct a noise subspace $\hat{U}_N$;

(2) a two-dimensional MUSIC power spectrum $$\tilde{P}_{MUSIC}(\theta, R) = \frac{1}{\tilde{a}^H(\theta, R)\hat{U}_N\hat{U}_N\tilde{a}(\theta, R)}$$

is calculated, wherein $\theta$ represents the angle, R represents the distance, and $\tilde{a}(\theta, R)$ represents a steering vector located at $(\theta, R)$ (3) spectral peak search is performed on $\tilde{P}_{MUSIC}(\theta, R)$, so as to obtain an estimation result $\{\hat{\theta}_k, \hat{R}_k\}_{k=1}^K$; and output: distance and angle estimation values $\{\hat{\theta}_k, \hat{R}_k\}_{k=1}^K$.

In the method for determining the angle and the distance of the target in various foregoing embodiments of the present disclosure, the coprime sampling technology is introduced, and the concept of the coprime frequency diversity array (i.e., a coprime frequency control array) is proposed. The coprime frequency control array avoids the limitation of physical sampling by using the concept of a differential co-matrix. Nevertheless, under the equivalence of co-matrix and frequency difference of the coprime frequency control array, the obtained virtual coprime frequency control array contains holes. In order to make full use of the array aperture and the degree of freedom of the virtual frequency control array, the present disclosure further recovers the locations of the holes. The received signal of the frequency control array is coupled on distance and angle, the covariance matrix thereof is obtained by a Kronecker product of two Toeplitz matrices. The covariance matrix complies with a double-Toeplitz structure, and the present disclosure further provides a solution for recovering such structure holes.

The present disclosure proposes an effective algorithm for joint estimation on angle and distance by using a coprime frequency control array model. The algorithm designs a semi-positive definite optimization problem for recovering holes of the virtual frequency control array based on decoupling atomic norm minimization. A reconstructed co-matrix covariance matrix is obtained by solving the semi-positive definite optimization problem. Finally, a two-dimensional MUSIC algorithm is used to perform two-dimensional estimation on the angle and distance of the final optimization matrix.

In the method for determining the angle and the distance of the target in various foregoing embodiments of the present disclosure, second-order statistics of the received signal of the coprime frequency control array are used, that is, the extended virtual frequency diversity array is generated by means of the covariance matrix. The number of array elements in the extended virtual frequency diversity array is greater than the number of array elements of an actual physical array. On this basis, the holes are filled by virtual interpolation, so that the number of array elements is further increased. The dimension of the finally obtained covariance matrix $\tilde{R}_{UV}$ may exceed the dimension provided by the actual received signal to a considerable extent, so that the degree of freedom for estimating the angle and distance of the target may be improved.

It should be understood that, although the steps in the flowchart of FIG. 2 are sequentially displayed according to the indication of arrows, these steps are not necessarily executed sequentially in the order indicated by the arrows. Unless explicitly stated herein, the execution of these steps is not strictly limited in order, so that these steps may be executed in other orders. Moreover, at least some steps in FIG. 2 may include a plurality of sub-steps or a plurality of stages, these sub-steps or stages are not necessarily executed at the same moment, but may be executed at different moments, and these sub-steps or stages are not necessarily performed in sequence, but may be executed in turn or alternately with at least some other sub-steps or sub-steps or stages of the other steps.

Simulation Experiment

The present disclosure provides a target angle and a distance estimation algorithm based on virtual interpolation of a coprime frequency diversity array, and in order to verify the performance advantages of the algorithm, one example process of the present disclosure is given below.

Parameter Configuration

A group of coprime numbers M=3, N=5 is extracted, the coprime frequency control array model has M+N−1=7 physical array elements, and M+N−1=7 frequency offsets. The unit distance between the array elements is d=0.5λ, the original center frequency is f0=10 GHz, and the unit frequency offset is Δf=30 KHz. It is set that the 7 physical array elements and the 7 frequency offsets have the same offset number array of {0, 3, 5, 6, 9, 10, 12}, then the location of a physical sensor of the parameter configuration is {0d,3d, 5d,6d,9d,10d,12d} and the frequency offset is {0Δf, 3Δf, 5Δf, 6Δf, 9Δf, 10Δf, 12Δf} and the formed coprime frequency control array model is as shown in FIG. 1.

Significant Improvement in the Degree of Freedom

For a uniform linear frequency control array containing 7 physical sensors and 7 frequency offsets, the maximum number of degrees of freedom obtained by using a traditional method is at most 7×7−1=48. As shown in FIG. 5, the present algorithm may implement joint two-dimensional estimation of the angles and distances of 74 targets, such that the degree of freedom is significantly improved, and the resolution is very high as well. In the present example, a signal to noise ratio (Signal To Noise Ratio, SNR) is set to be 20 dB, and the number of snapshots is set to be 200.

(3) Comparison of Root Mean Square Error (Root Mean Square Error, RMSE)

Figure 6A:
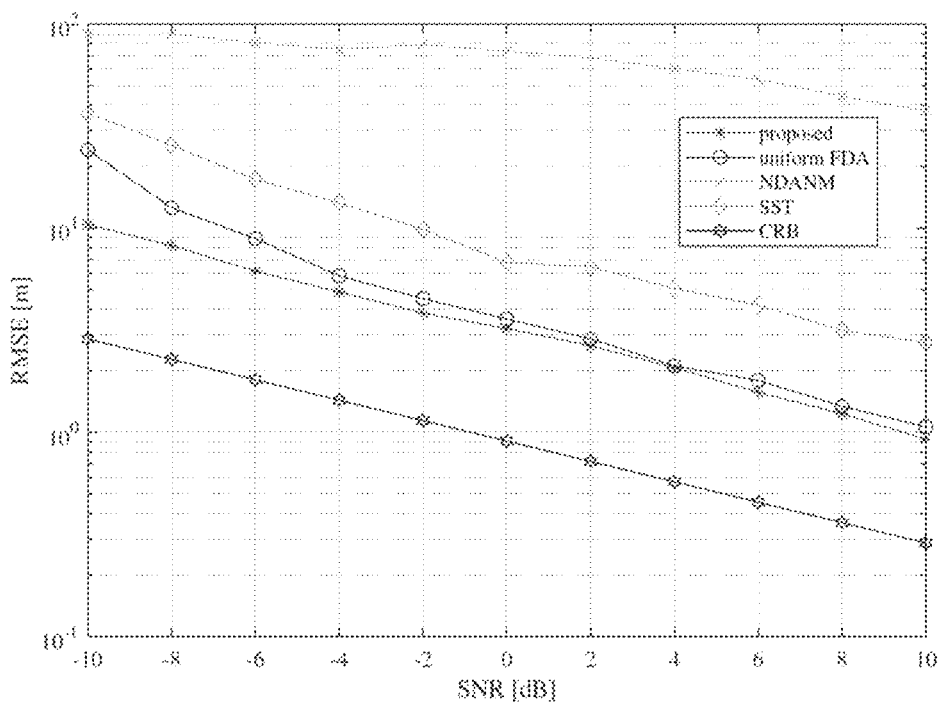
FIG. 6(a) is an SNR-distance RMSE curve chart in one embodiment.
Figure 6B:
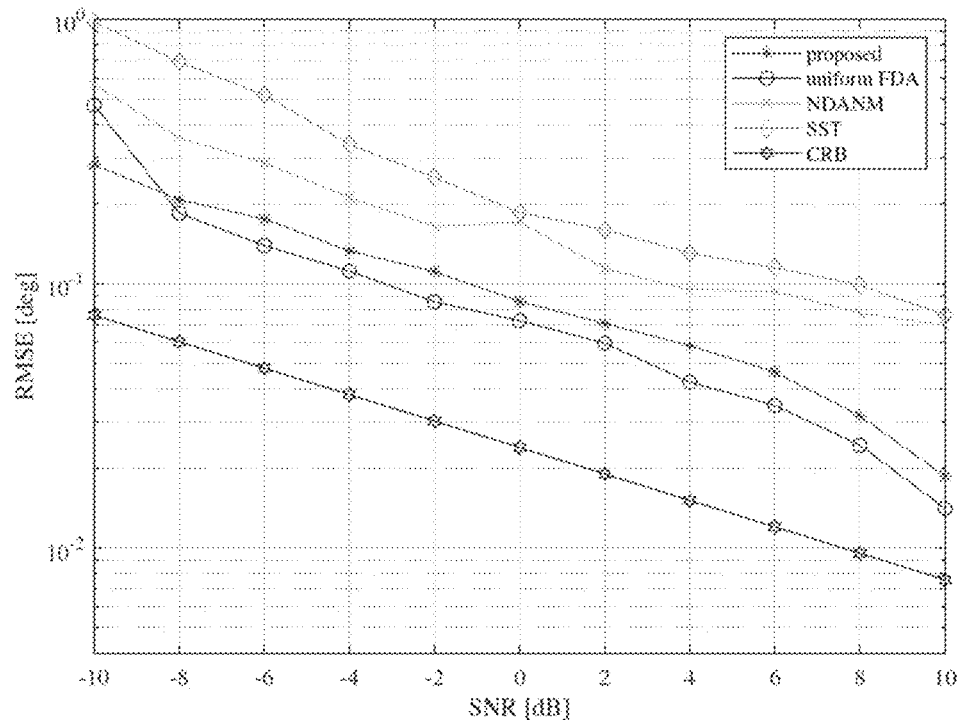
FIG. 6(b) is an SNR-angle RMSE curve chart in one embodiment.
Figure 6C:
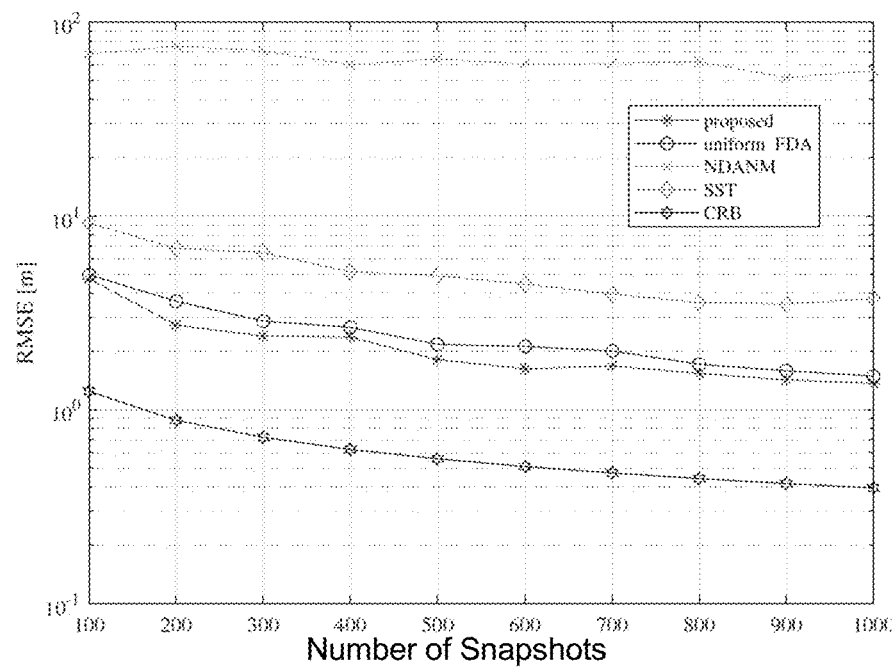
FIG. 6(c) is a snapshot number-distance RMSE curve chart in one embodiment.
Figure 6D:
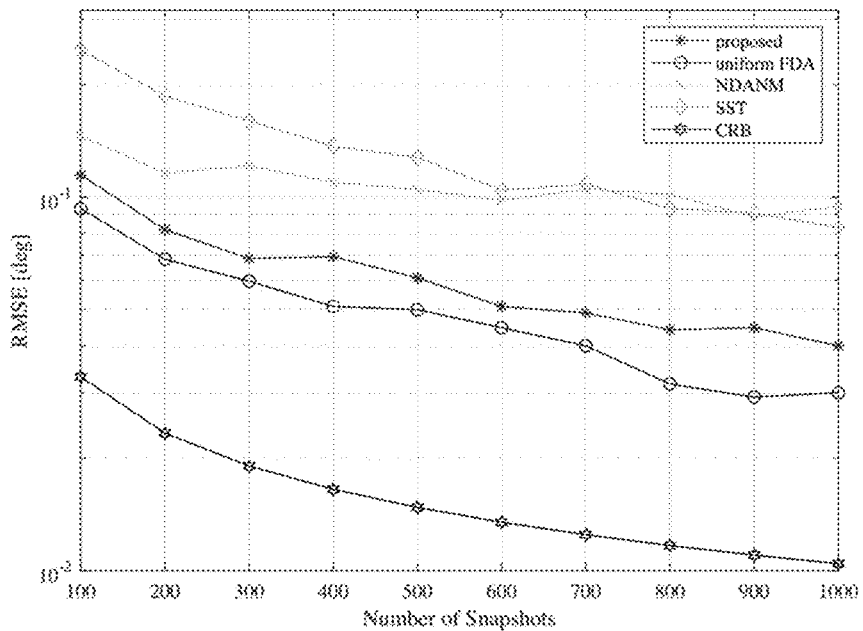
FIG. 6(d) is a snapshot number-angle RMSE curve chart in one embodiment.

In order to further display the performance advantages of the proposed method, the RMSE of the method proposed in the present disclosure is analyzed below from two aspects, that is, the influence of the number of snapshots and the signal to noise ratio on the RMSE. In addition, the proposed method is to perform two-dimensional estimation on the angle and distance, and the RMSE may be divided into an angle RMSE and a distance RMSE. The method proposed in the present disclosure is compared with a uniform frequency diversity array (Uniform FDA), normal decoupling atomic norm minimization (Normal Decoupling Atomic Norm Minimization, NDANM) and spatial smoothing algorithm (Spatial Smoothing Algorithm, SST), and in addition, a Cramer-Rao bound (Cramer-Rao Bound, CRB) is also compared. FIG. 6(a) and FIG. 6(b) show the influence of the SNR on the distance RMSE and the angle RMSE, respectively, the number of snapshots is set to be 300. Obviously, the proposed method is obviously superior to the NDANM and the SST. Compared with the uniform frequency diversity array, the distance RMSE is better and the angle RMSE is slightly worse, but the degree of freedom improved by the present algorithm is much greater than the degree of freedom of the uniform frequency diversity array. FIG. 6(c) and FIG. 6(d) respectively show the influence of the number of snapshots on the distance RMSE and the angle RMSE, and the signal to noise ratio is set to be 3 dB. It is shown in the figures that, the simulation result of the number of snapshots is similar to the simulation result of the signal to noise ratio.

The above simulation results fully illustrate that the method proposed in the present disclosure significantly improves the degree of freedom for estimating the angle and the distance of the target, and has a good spatial resolution.

Figure 7:
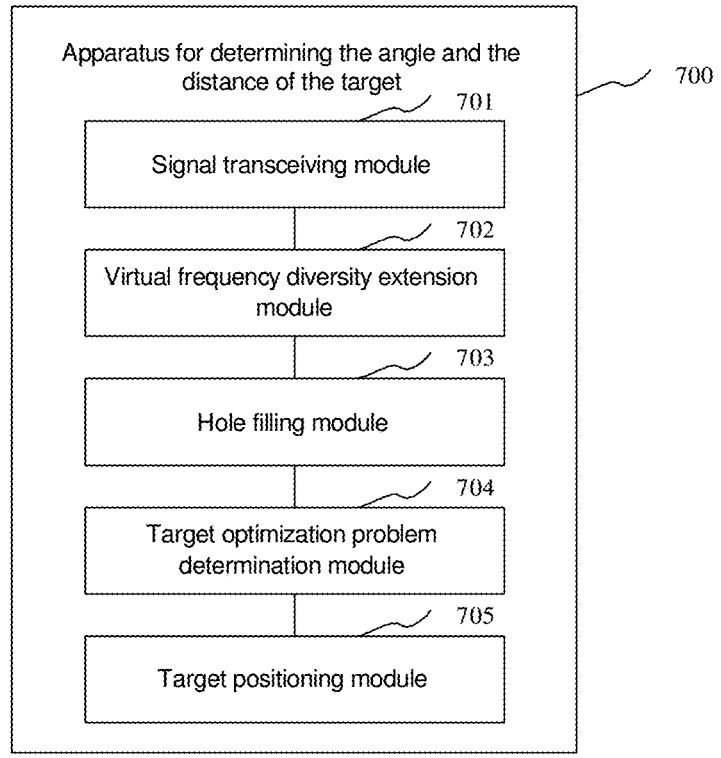
FIG. 7 is a structural block diagram of an apparatus for determining the angle and the distance of the target in one embodiment.

In one embodiment, as shown in FIG. 7, provided is an apparatus 700 for determining an angle and a distance of a target, including: a signal transceiving module 701, a virtual frequency diversity extension module 702, a hole filling module 703, an objective optimization problem determination module 704 and a target positioning module 705, wherein:

the signal transceiving module 701 is configured to transmit a frequency diversity signal to a target by means of a transmitter of a local radar, and receive, by means of a receiver of the local radar, a received signal reflected by the target, wherein the receiver includes a coprime array, and the frequency offset of the frequency diversity signal has the same coprime structure as the coprime array of the receiver;

the virtual frequency diversity extension module 702 is configured to determine an equivalent received signal vector of an extended virtual frequency diversity array according to the frequency diversity signal and the received signal, wherein the extended virtual frequency diversity array contains holes;

the hole filling module 703 is configured to perform hole filling processing based on the equivalent received signal vector, so as to determine a uniform received signal vector of a uniform virtual frequency diversity array not containing the holes;

the objective optimization problem determination module 704 is configured to determine an equivalent received signal equation based on the uniform received signal vector, and establish an objective function and a constraint condition for solving an objective optimization problem of the equivalent received signal equation; and the target positioning module 705 is configured to solve the objective optimization problem to obtain an objective solution matrix, and determine the angle and distance of the target based on the objective solution matrix.

With regard to specific definitions of the apparatus 700 for determining the angle and the distance of the target, reference may be made to the definitions of the method for determining the angle and the distance of the target as described above, and thus details are not described herein again. All or some modules of the apparatus 700 for determining the angle and the distance of the target may be implemented by software, hardware, and a combination thereof. The foregoing modules may be embedded into or independent of a processor in a computer device in the form of hardware, and may also be stored in a memory in the computer device in the form of software, so that the processor calls corresponding operations for executing the foregoing modules.

Figure 8:
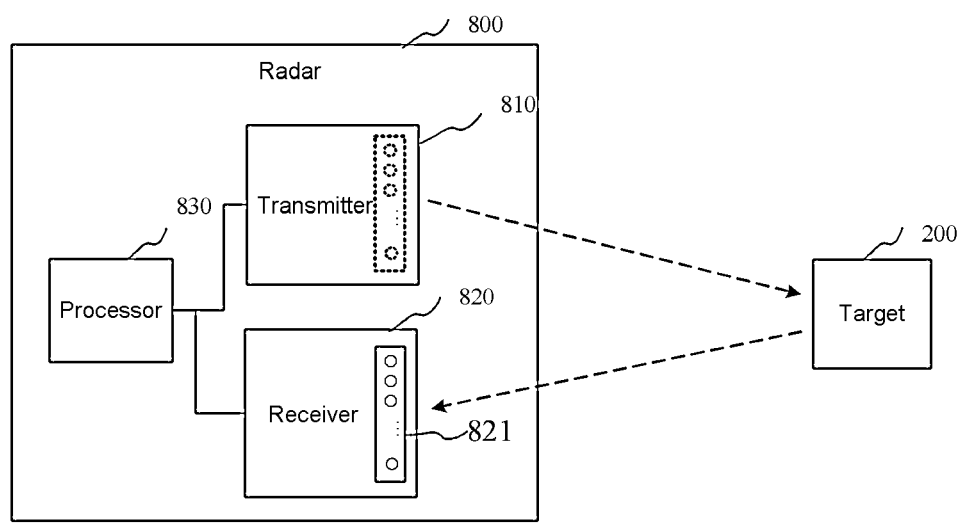
FIG. 8 is a schematic structural diagram of a radar in one embodiment.

In one embodiment, as shown in FIG. 8, provided is a radar 800, including a transmitter 810, a receiver 820 and a processor 830, wherein the transmitter 810 and the receiver 820 are respectively connected with the processor 830, the transmitter 810 is configured to transmit a frequency diversity signal to a target, and a frequency offset of the frequency diversity signal has a coprime structure;

the receiver 820 includes a coprime array 821, the coprime structure of the coprime array 821 is the same as the coprime structure of the frequency offset of the frequency diversity signal transmitted by the transmitter 810, and each array element of the coprime array 821 is configured to receive a received signal which is formed by reflecting the frequency diversity signal by a target 200; and As an example, in one embodiment, the coprime array 821 of the receiver 820 includes a first sub-array and a second sub-array, wherein the first sub-array is formed by uniformly arranging a plurality of array elements (antennas) at a first array element interval, and the second sub-array is formed by uniformly arranging a plurality of array elements at a second array element interval, wherein the first array element interval is not equal to the second array element interval, the first array element of the first sub-array and the first array element of the second sub-array may share the same array element. The plurality of array elements of the first sub-array and the plurality of array elements of the second sub-array are collectively arranged in an array, so as to form the coprime array 821, so that the coprime array 821 has a coprime structure.

In one embodiment, the transmitter 810 may include a single antenna or a plurality of antennas, and the transmitter 810 transmits the frequency diversity signal by means of a single antenna or a plurality of antennas together, wherein the frequency offset of the frequency diversity signal includes a first frequency diversity and a second frequency diversity, wherein the first frequency diversity is formed by a plurality of transmission frequencies which uniformly offset at a first unit frequency offset, and the second frequency diversity is formed by a plurality of transmission frequencies which uniformly offset at a second unit frequency offset, wherein the first unit frequency offset is not equal to the second unit frequency offset, the first transmission frequency of the first frequency diversity and the first transmission frequency of the second frequency diversity may have the same frequency, and the plurality of transmission frequencies of the first frequency diversity and the plurality of transmission frequencies of the second frequency diversity are collectively arranged to form the frequency offset of the frequency diversity signal. Therefore, the frequency offset of the frequency diversity signal also has a coprime structure, and the coprime structure of the frequency offset of the frequency diversity signal is the same as the coprime structure of the coprime array 821. That is, an offset array of frequency offsets between the transmission frequencies in the frequency diversity signal is the same as an offset array of location offsets between the array elements in the coprime array.

Exemplarily, if a frequency of sub-carrier contained in the frequency diversity signal transmitted by the antenna of the transmitter 810 is $f_0+\{0\Delta f, 3\Delta f, 5\Delta f, 6\Delta f, 9\Delta f, 10\Delta f, 12\Delta f\}$, then correspondingly, the location of the array element 821 of the coprime array of the receiver 820 having the same coprime structure as the frequency diversity signal is $\{0d, 3d, 5d, 6d, 9d, 10d, 12d\}$ The processor 830 is configured to execute the following steps:

transmitting a frequency diversity signal to the target 200 by means of the transmitter 810 of the local radar 800, and receiving, by means of the receiver 820 of the local radar 800, a received signal reflected by the target 200;

determining an equivalent received signal vector of an extended virtual frequency diversity array according to the frequency diversity signal and the received signal, wherein the extended virtual frequency diversity array contains holes;

performing hole filling processing based on the equivalent received signal vector, so as to determine a uniform received signal vector of a uniform virtual frequency diversity array not containing the holes;

determining an equivalent received signal equation based on the uniform received signal vector, and establishing an objective function and a constraint condition for solving an objective optimization problem of the equivalent received signal equation; and solving the objective optimization problem to obtain an objective solution matrix, and determining the angle and distance of the target 200 based on the objective solution matrix.

In other embodiments, the processor 830 further executes the steps of the method for determining the angle and the distance of the target according to any one of the above embodiments.

It can be understood by those skilled in the art that, the structure shown in FIG. 8 is merely a block diagram of some structures related to the solutions of the present disclosure, but does not constitute a definition of a radar to which the solutions of the present disclosure are applied, and the specific radar may include more or fewer components than those shown in the figures, or combine some components, or have different component arrangements.

In one embodiment, provided is a computer-readable storage medium, wherein a computer program is stored thereon, and when executed by a processor, the computer program executes the following steps:

transmitting a frequency diversity signal to a target by means of a transmitter of a local radar, and receiving, by means of a receiver of the local radar, a received signal reflected by the target, wherein the receiver includes a coprime array, and the frequency offset of the frequency diversity signal has the same coprime structure as the coprime array of the receiver;

determining an equivalent received signal vector of an extended virtual frequency diversity array according to the frequency diversity signal and the received signal, wherein the extended virtual frequency diversity array contains holes;

performing hole filling processing based on the equivalent received signal vector, so as to determine a uniform received signal vector of a uniform virtual frequency diversity array not containing the holes;

determining an equivalent received signal equation based on the uniform received signal vector, and establishing an objective function and a constraint condition for solving an objective optimization problem of the equivalent received signal equation; and solving the objective optimization problem to obtain an objective solution matrix, and determining the angle and distance of the target based on the objective solution matrix.

In other embodiments, when executed by the processor, the computer program further implements the steps of the method for determining the angle and the distance of the target according to any one of the above embodiments.

Those ordinary skilled in the art can understand that, all or some processes in the methods in the foregoing embodiments may be implemented by a computer program instructing related hardware, and the computer program may be stored in a non-volatile computer-readable storage medium, and when executed, the computer program may include the processes of the embodiments of the foregoing methods. Any reference to the memory, the storage, the database or other media used in the various embodiments provided in the present disclosure may include non-volatile and/or volatile memories. The non-volatile memory may include a read-only memory (ROM), a programmable ROM (PROM), an electrically programmable ROM (EPROM), an electrically erasable programmable ROM (EEPROM), or a flash memory. The volatile memory may include a random access memory (RAM) or an external cache. By way of illustration and not limitation, the RAM may be available in various forms, such as a static RAM (SRAM), a dynamic RAM (DRAM), a synchronous DRAM (SDRAM), a dual-data rate SDRAM (DDRSDRAM), an enhanced SDRAM (ESDRAM), a synchlink (Synchlink) DRAM (SLDRAM), a memory bus (Rambus) direct RAM (RDRAM), a direct memory bus dynamic RAM (DRDRAM), and a memory bus dynamic RAM (RDRAM), etc.

As used in the present disclosure, the terms "component", "module", "system" and the like are intended to represent computer-related entities, which may be hardware, a combination of hardware and software, software, or software in execution. For example, a component may be, but is not limited to, a process running on a processor, a processor, an object, an executable code, an executed thread, a program, and/or a computer. By way of illustration, an application running on a server and the server both may be components. One or more components may reside in a process and/or an executed thread, and the components may be located in one computer and/or distributed between two or more computers.

Various technical features of the above embodiments may be combined arbitrarily, for the conciseness of description, not all possible combinations of the technical features in the above embodiments are described, however, as long as there is no contradiction in the combinations of these technical features, they should be considered as the scope recorded in the present specification.

The above embodiments merely express several embodiments of the present disclosure, and the description thereof is relatively specific and detailed, but cannot be understood as limitations to the scope of invention patent. It should be noted that, those ordinary skilled in the art may made several variations and improvements without departing from the concept of the present disclosure, and all these variations and improvements fall within the protection scope of the present disclosure. Therefore, the protection scope of the present disclosure shall be subject to the appended claims.

What is claimed is:

1. A method for determining an angle and a distance of a target, comprising:

transmitting a frequency diversity signal to the target by means of a transmitter of a local radar, and receiving, by means of a receiver of the local radar, a received signal reflected by the target, wherein the receiver comprises a coprime array, and a frequency offset of the frequency diversity signal has a same coprime structure as the coprime array of the receiver;

determining an equivalent received signal vector of an extended virtual frequency diversity array according to the frequency diversity signal and the received signal, wherein the extended virtual frequency diversity array contains holes;

performing hole filling processing based on the equivalent received signal vector, so as to determine a uniform received signal vector of a uniform virtual frequency diversity array not containing the holes;

determining an equivalent received signal equation based on the uniform received signal vector, and establishing a first objective function and a first constraint condition for solving an objective optimization problem of the equivalent received signal equation; and solving the objective optimization problem to obtain an objective solution matrix, and determining the angle and the distance of the target base on the objective solution matrix.

2. The method for determining the angle and the distance of the target as claimed in claim 1, wherein an offset array composed of a plurality of frequency offsets between transmission frequencies in the frequency diversity signal is the same as an offset array composed of a plurality of location offsets between array elements in the coprime array.

3. The method for determining the angle and the distance of the target as claimed in claim 1, wherein the receiver comprises the coprime array, and the coprime array comprises:

a first sub-array, formed by uniformly arranging a plurality of array elements at a first array element interval; and a second sub-array, formed by uniformly arranging a plurality of array elements at a second array element interval, wherein the plurality of array elements of the first sub-array and the plurality of array elements of the second sub-array are collectively arranged in an array, so as to form the coprime array, and the first array element interval is not equal to the second array element interval.

4. The method for determining the angle and the distance of the target as claimed in claim 3, wherein a first array element of the first sub-array and a first array element of the second sub-array are a same array element.

5. The method for determining the angle and the distance of the target as claimed in claim 1, wherein the frequency of the frequency diversity signal comprises:

a first frequency diversity, formed by a first plurality of transmission frequencies which uniformly offset at a first unit frequency offset; and a second frequency diversity, formed by a second plurality of transmission frequencies which uniformly offset at a second unit frequency offset, wherein the first plurality of transmission frequencies of the first frequency diversity and the second plurality of transmission frequencies of the second frequency diversity are collectively arranged to form the frequency of the frequency diversity signal, and the first unit frequency offset is not equal to the second unit frequency offset.

6. The method for determining the angle and the distance of the target as claimed in claim 5, wherein a first transmission frequency of the first frequency diversity and a first transmission frequency of the second frequency diversity may have a same frequency.

7. The method for determining the angle and the distance of the target as claimed in claim 1, wherein the transmitter comprises a single antenna; and transmitting the frequency diversity signal to the target by means of the transmitter of the local radar, comprises:
transmitting the frequency diversity signal to the target by means of the single antenna of the transmitter of the local radar.

8. The method for determining the angle and the distance of the target as claimed in claim 1, wherein the transmitter comprises a plurality of antennas; and transmitting the frequency diversity signal to the target by means of the transmitter of the local radar, comprises:
transmitting the frequency diversity signal to the target by means of the plurality of antennas of the transmitter of the local radar together.

9. The method for determining the angle and the distance of the target as claimed in claim 1, wherein determining the equivalent received signal vector of the extended virtual frequency diversity array according to the frequency diversity signal and the received signal, wherein the extended virtual frequency diversity array contains holes, comprises:

establishing a coprime array model according to coprime structure information of the coprime array of the receiver, wherein the coprime array model is formed by two uniform sparse sub-arrays;
establishing a frequency diversity model according to the frequency diversity information of the frequency diversity signal transmitted by the transmitter;
determining a received signal vector of the coprime array according to the received signal, the frequency diversity model and the coprime array model;
determining a covariance matrix of the coprime array according to the received signal vector; and
vectorizing the covariance matrix to obtain the equivalent received signal vector of the extended virtual frequency diversity array, wherein the equivalent received signal vector contains steering vectors of the extended virtual frequency diversity array; and the extended virtual frequency diversity array contains holes.

10. The method for determining the angle and the distance of the target as claimed in claim 1, wherein performing hole filling processing based on the equivalent received signal vector, so as to determine the uniform received signal vector of the uniform virtual frequency diversity array not containing the holes, comprises:

determining a non-negative received signal vector of a non-negative area in the extended virtual frequency diversity array according to the equivalent received signal vector;
determining a non-negative covariance matrix of the coprime array according to the non-negative received signal vector;
vectorizing the non-negative covariance matrix, so as to obtain a non-negative equivalent virtual array received signal vector; and
removing repetitive elements in the non-negative equivalent virtual array received signal vector, and rearranging remaining elements, so as to determine the uniform received signal vector of the uniform virtual frequency diversity array.

11. The method for determining the angle and distance of the target as claimed in claim 10, wherein the non-negative equivalent virtual array received signal vector contains a steering vector of the coprime array and a steering vector of the frequency offset, wherein the steering vector of the coprime array and the steering vector of the frequency offset are decoupled from each other;

removing the repetitive elements in the non-negative equivalent virtual array received signal vector, and rearranging the remaining elements, so as to determine the uniform received signal vector of the uniform virtual frequency diversity array, comprises:
removing repetitive elements in the steering vector of the coprime array, and rearranging remaining elements, so as to obtain steering vectors of the coprime array not containing the holes;
removing repetitive elements in the steering vector of the frequency offset, and rearranging remaining elements, so as to obtain steering vectors of the frequency offset not containing the holes;
based on the steering vectors of the coprime array not containing the holes and the steering vectors of the frequency offset not containing the holes, determining the steering vector of the uniform virtual frequency diversity array not containing the holes; and
determining the uniform received signal vector of the uniform virtual frequency diversity array according to the steering vector of the uniform virtual frequency diversity array.

12. The method for determining the angle and the distance of the target as claimed in claim 1, wherein establishing the first objective function and the first constraint condition for solving the objective optimization problem of the equivalent received signal equation, comprises:

establishing a noise-free received signal model of the extended virtual frequency diversity array according to the equivalent received signal equation;
determining an atomic norm of the noise-free received signal model, introducing a minimum convex relaxation atomic number, converting the atomic norm into a convex relaxation atomic norm, and determining a second objective function and a second constraint condition of an optimization problem for minimizing the convex relaxation atomic norm;
converting the optimization problem into a positive semi-definite problem, so as to determine a third objective function and a third constraint condition of the positive semi-definite problem; and
converting the positive semi-definite problem into an objective optimization problem for accommodating the number of elements in the extended virtual frequency diversity array to control a noise threshold value, so as to determine the first objective function and the first constraint condition of the objective optimization problem.

13. The method for determining the angle and the distance of the target as claimed in claim 1, wherein solving the objective optimization problem to obtain the objective solution matrix, and determining the angle and distance of the target based on the objective solution matrix, comprises:

solving the objective optimization problem, so as to determine an objective solution matrix;

selecting corresponding elements from the objective solution matrix, so as to construct a covariance matrix of the uniform virtual frequency diversity array; and performing estimation processing on the covariance matrix, so as to determine the angle and the distance of the target.

14. A radar, comprising a transmitter, a receiver and a processor, and the transmitter and the receiver being respectively connected with the processor, wherein:

the transmitter is configured to transmit a frequency diversity signal to a target, and a frequency offset of the frequency diversity signal has a first coprime structure;

the receiver comprises a coprime array, a second coprime structure of the coprime array is the same as the first coprime structure of the frequency offset of the frequency diversity signal, and each array element of the coprime array is configured to receive a received signal which is formed by reflecting the frequency diversity signal by the target; and the processor is configured to execute following actions:

transmitting the frequency diversity signal to the target by means of the transmitter of a local radar, and receiving, by means of the receiver of the local radar, a received signal reflected by the target, wherein the receiver comprises the coprime array, and the first coprime structure of the frequency offset of the frequency diversity signal is the same as the second coprime structure of the coprime array of the receiver;

determining an equivalent received signal vector of an extended virtual frequency diversity array according to the frequency diversity signal and the received signal, wherein the extended virtual frequency diversity array contains holes;

performing hole filling processing based on the equivalent received signal vector, so as to determine a uniform received signal vector of a uniform virtual frequency diversity array not containing the holes;

determining an equivalent received signal equation based on the uniform received signal vector, and establishing a first objective function and a first constraint condition for solving an objective optimization problem of the equivalent received signal equation; and solving the objective optimization problem to obtain an objective solution matrix, and determining the angle and the distance of the target base on the objective solution matrix.

15. The radar as claimed in claim 14, wherein the coprime array of the receiver comprises:

a first sub-array, formed by uniformly arranging a plurality of array elements at a first array element interval; and a second sub-array, formed by uniformly arranging a plurality of array elements at a second array element interval, wherein the plurality of array elements of the first sub-array and the plurality of array elements of the second sub-array are collectively arranged in an array, so as to form the coprime array, and the first array element interval is not equal to the second array element interval.

16. The radar as claimed in claim 14, wherein the frequency of the frequency diversity signal comprises:

a first frequency diversity, formed by a first plurality of transmission frequencies which uniformly offset at a first unit frequency offset; and a second frequency diversity, formed by a second plurality of transmission frequencies which uniformly offset at a second unit frequency offset, wherein the first plurality of transmission frequencies of the first frequency diversity and the second plurality of transmission frequencies of the second frequency diversity are collectively arranged to form the frequency of the frequency diversity signal, and the first unit frequency offset is not equal to the second unit frequency offset.

17. The radar as claimed in claim 14, wherein the transmitter comprises a single antenna; and the transmitter is configured to transmit the frequency diversity signal to the target by means of the single antenna.

18. The radar as claimed in claim 14, wherein the transmitter comprises a plurality of antennas; and the transmitter is configured to transmit the frequency diversity signal to the target by means of the plurality of antennas together.

19. A non-transitory computer-readable storage medium, wherein a computer program is stored thereon, and when executed by a processor, the computer program implements following actions:

transmitting a frequency diversity signal to a target by means of a transmitter of a local radar, and receiving, by means of a receiver of the local radar, a received signal reflected by the target, wherein the receiver comprises a coprime array, and a frequency offset of the frequency diversity signal has a same coprime structure as the coprime array of the receiver;

determining an equivalent received signal vector of an extended virtual frequency diversity array according to the frequency diversity signal and the received signal, wherein the extended virtual frequency diversity array contains holes;

performing hole filling processing based on the equivalent received signal vector, so as to determine a uniform received signal vector of a uniform virtual frequency diversity array not containing the holes;

determining an equivalent received signal equation based on the uniform received signal vector, and establishing a first objective function and a first constraint condition for solving an objective optimization problem of the equivalent received signal equation; and solving the objective optimization problem to obtain an objective solution matrix, and determining the angle and the distance of the target base on the objective solution matrix.

20. The non-transitory computer-readable storage medium as claimed in claim 19, wherein an offset array composed of a plurality of frequency offsets between transmission frequencies in the frequency diversity signal is the same as an offset array composed of a plurality of location offsets between array elements in the coprime array.

* * * * *